(12) United States Patent
Traill et al.

(10) Patent No.: US 9,058,234 B2
(45) Date of Patent: Jun. 16, 2015

(54) SYNCHRONIZATION OF CONTROL APPLICATIONS FOR A GRID NETWORK

(71) Applicant: General Electric Company, Schenectady, NY (US)

(72) Inventors: Bill Traill, Livingston (GB); Yee-Men Chen, Livingston (GB); Sarah Campbell, Livingston (GB); Glenda Paulette Simons, Cambridge (GB); Michael Stanislawski, Cambridge (GB)

(73) Assignee: General Electric Company, Schenectady, NY (US)

(*) Notice: Subject to any disclaimer, the term of this patent is extended or adjusted under 35 U.S.C. 154(b) by 74 days.

(21) Appl. No.: 13/929,979

(22) Filed: Jun. 28, 2013

(65) Prior Publication Data

US 2015/0007160 A1    Jan. 1, 2015

(51) Int. Cl.
*G06F 9/44* (2006.01)
*G06F 9/445* (2006.01)
*H02J 3/38* (2006.01)

(52) U.S. Cl.
CPC .. *G06F 8/65* (2013.01); *G06F 8/61* (2013.01); *H02J 3/38* (2013.01)

(58) Field of Classification Search
CPC ..................................... G06F 8/65; G06F 8/61
USPC ........................................ 717/171, 168, 176
See application file for complete search history.

(56) References Cited

U.S. PATENT DOCUMENTS

| 6,058,395 | A  | * | 5/2000  | Buzaglo et al. ........................ 1/1 |
| 7,177,646 | B2 | * | 2/2007  | O'Neill et al. ................ 455/450 |
| 7,921,368 | B2 | * | 4/2011  | Moody et al. .................. 715/751 |
| 8,719,185 | B2 | * | 5/2014  | Carey et al. .................... 705/412 |
| 2004/0205779 | A1 | * | 10/2004 | Almeida et al. ................ 719/321 |
| 2005/0240381 | A1 | * | 10/2005 | Seiler et al. ....................... 703/1 |
| 2006/0130042 | A1 | * | 6/2006  | Dias et al. ...................... 717/168 |
| 2007/0088630 | A1 | * | 4/2007  | MacLeod et al. ............... 705/28 |
| 2009/0281673 | A1 | * | 11/2009 | Taft ............................... 700/286 |
| 2012/0316697 | A1 |   | 12/2012 | Boardman et al. |
| 2013/0030778 | A1 |   | 1/2013  | Andoji et al. |
| 2013/0103724 | A1 |   | 4/2013  | Qiu et al. |
| 2013/0116838 | A1 |   | 5/2013  | He |
| 2013/0117245 | A1 |   | 5/2013  | Robinson |
| 2014/0244329 | A1 | * | 8/2014  | Urban .......................... 705/7.15 |

OTHER PUBLICATIONS

U.S. Appl. No. 13/861,333, filed Apr. 11, 2013, Oliver Williams Sims.
U.S. Appl. No. 13/908,966, filed Jun. 3, 2013, Michael Stanislawski.

* cited by examiner

*Primary Examiner* — Phillip H Nguyen
(74) *Attorney, Agent, or Firm* — Parks Wood LLC

(57) ABSTRACT

A non-transitory, computer-readable medium storing instructions is presented. The instructions may cause a control system to receive a proposed update to a grid system. The instructions may also cause the control system to create a patch based on the proposed update to amend infrastructure information relating to the grid system upon receipt of the proposed update. Additionally, the instructions may cause the control system to implement the patch by storing the amended infrastructure information in memory. Furthermore, the instructions may cause the control system to send a patch update related to the patch to a master application.

19 Claims, 4 Drawing Sheets

SYNCHRONIZATION OF CONTROL APPLICATIONS FOR A GRID NETWORK

BACKGROUND

The subject matter disclosed herein relates to utilities infrastructures, and more particularly to methods and a system for updating network infrastructure information between control applications.

Infrastructures for grid networks include a variety of systems and components. For example, the systems may include power generation systems, metering systems, digital communications systems, control systems, and/or their related components. Certain actions may be associated with the infrastructure may include maintenance of systems, rerouting transmissions, installation of new systems, and removal of systems. Each of the associated actions may affect the performance and/or routing of the system. Moreover, operation of the grid network may be controlled and/or monitored using various control applications. Each of the applications stores and/or monitors some information about the infrastructure for the grid system.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a non-transitory, computer-readable medium storing instructions is provided. The instructions may cause a control system to receive a proposed update to a grid system. The instructions may also cause the control system to create a patch based on the proposed update to amend infrastructure information relating to the grid system upon receipt of the proposed update. Additionally, the instructions may cause the control system to implement the patch by storing the amended infrastructure information in memory. Furthermore, the instructions may cause the control system to send a patch update related to the patch to a master application.

In another embodiment, a device for synchronizing infrastructure information regarding a grid system is provided. The device includes a processor configured to receive a proposed update to a grid system and upon receipt of the proposed update, create a patch to amend previously-stored infrastructure information relating to the grid system. The device also includes a memory configured to store the amended infrastructure information as the patch. Further, the processor is configured to send the patch to a master application, receive a finalized update from the master application as the patch, and after receiving the finalized update from the master application, replace the patch in memory with the formal update.

In another embodiment, a non-transitory, computer-readable medium storing instructions is presented. The instructions are configured to cause a computing system to receive a patch from a slave application configured to control at least a portion of the grid system. Moreover, the patch reflects amended infrastructure information regarding the grid system. The instructions also cause the computing system to formally update stored infrastructure information with the amended infrastructure information. Furthermore, the instructions are also configured to cause the computing system to transmit the updated stored infrastructure information as a formal update to the slave application

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the invention, the articles "a," "an," "the," and "said" are intended to mean that there are one or more of the elements. The terms "comprising," "including," and "having" are intended to be inclusive and mean that there may be additional elements other than the listed elements.

As discussed below, computing systems may be used in a variety of control applications that each control various attributes and/or portions of the grid networks. Control applications for grid networks store, access, and/or use a voluminous amount of data that indicates various information about the grid networks. To reduce the cost of the grid network, the control applications may designate one control application as a master application that stores infrastructure information and transmits the stored information to one or more slave applications. However, in some embodiments, it may be desirable to update a slave application sooner than the master application is updated. For example, the master application may control less time-critical functions (e.g., future planning), which are not updated as often as may be desired by a slave application, which controls more time-critical functions (e.g., power distribution). Moreover, in some embodiments, the master application may use a longer update period (e.g., having greater detail) than an update used by one or more slave applications. Accordingly, in certain embodiments, a slave application may be updated prior to an update of the master application and/or during a pending update (e.g., waiting on new cartographic images) of the master application. Additionally, in some embodiments, the slave application may "redline" a patch that visually distinguishes infrastructure information that has been patched.

Figure 1:
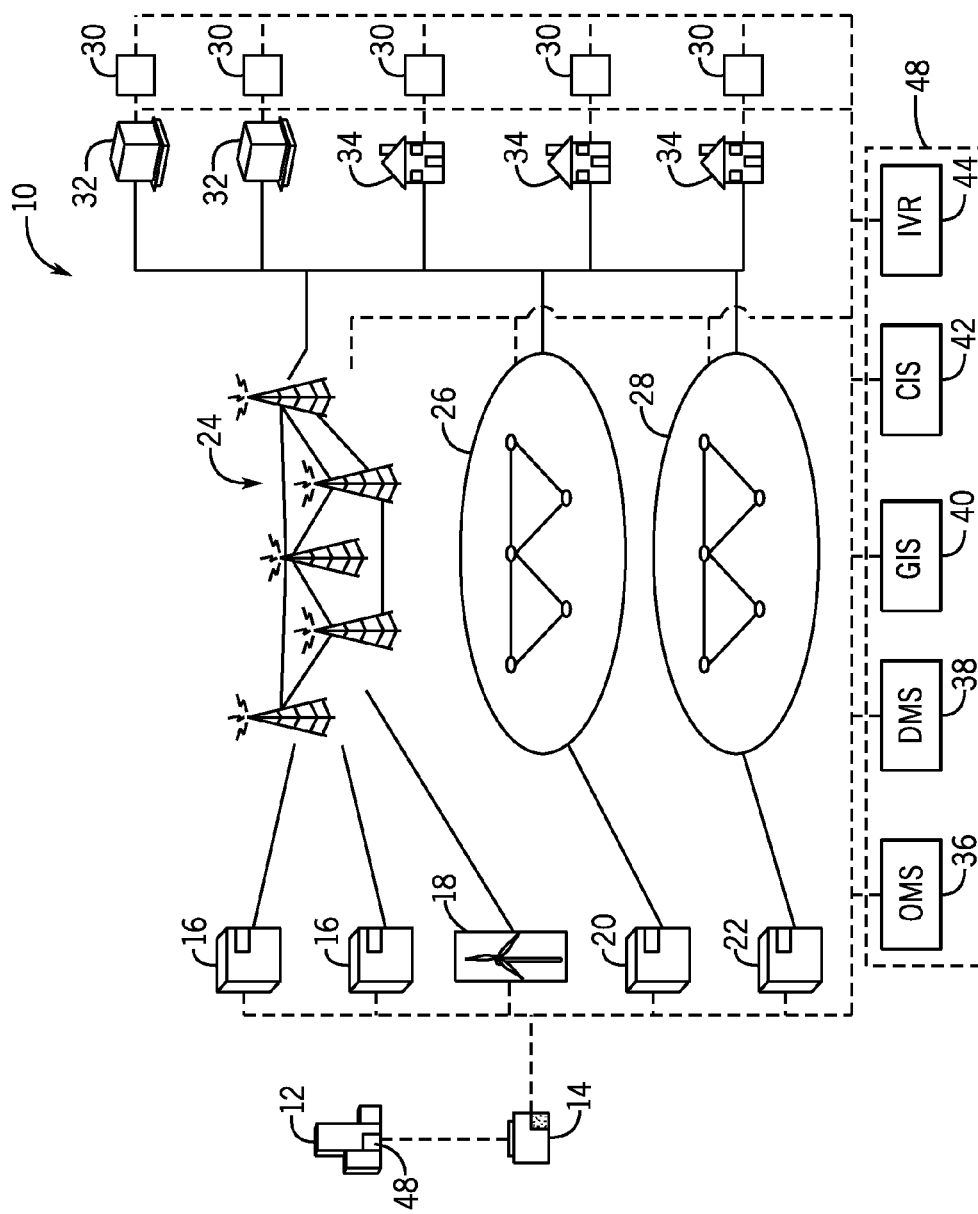
FIG. 1 illustrates a block diagram of an embodiment of an utility network infrastructure.

With the foregoing in mind, it may be useful to describe an embodiment of an infrastructure, such as grid system 10 illustrated in FIG. 1. It is to be noted that the systems and methods described herein may include various infrastructures, such as cloud computing infrastructure, airport infrastructure, transit infrastructure, smart grid infrastructures, electrical power infrastructures, and telecommunications infrastructure. As depicted, the grid system 10 may include one or more utilities 12. The utility 12 may provide for oversight operations of the grid system 10. For example, utility control centers 14 may monitor and direct power produced by one or more power generation stations 16 and alternative power generation stations 18. The power generation stations 16 may include conventional power generation stations, such as power generation stations using gas, coal, biomass, and other carbonaceous products for fuel. The alternative power generation stations 18 may include power generation stations using solar power, wind power, hydroelectric power, geothermal power, and other alternative sources of power (e.g., renewable energy) to produce electricity. Other infrastructure components may include a water processing plant 20 and gas processing plant 22. For example, water processing plants 20 may provide for potable water, and gas processing plants 22 may provide for natural gas.

The power generated by the power generation stations 16 and 18 may be distributed through a power transmission grid 24. Likewise, the water and gas provided by the plants 20 and 22 may be delivered through a water distribution grid 26 and a gas distribution grid 28. The grids 24, 26, and 28 may cover a broad geographic region or regions, such as one or more municipalities, states, or countries. In the depicted embodiment, a metering infrastructure 30 may be used to measure, collect, and analyze electricity, water, and/or gas usage. The metering infrastructure 30 may be communicatively coupled to one or more of the components of the grid 10, including the grids 24, 26, 28. Additionally, the metering infrastructure 30 may enable two-way communication between commercial sites 32, residences 34 and the utility control center 14, providing for a link between consumer behavior and utility consumption (e.g., electric, water, and/or gas consumption). For example, AMI meters 30 may track and account for pre-paid electricity, water and/or gas in a similar fashion to pre-paid cell phone usage. In some embodiments, washer/dryers, electric car chargers, and other flexible power consumption appliances may be programmed to operate during low demand hours, resulting in lower utility bills and a more balanced utilization of energy.

An outage management system (OMS) 36 may predict and respond to outage events, for example, by using an outage prediction engine. The OMS 36 may interact with a distribution management system (DMS) 38 suitable for routing power, water, and/or gas through the grid system 10 from plants 16, 18, 20, and 22 according to demand. A graphical information system (GIS) 40 may also be used to provide for physical location information of the plants 16, 18, 20, and 22, grid 24 components (e.g., electrical cabling, transformers, distribution towers), grid 26 components (e.g., water pipes, valves, pressure reducers), grid 28 components (e.g., storage tanks, gas pipes, valves), the metering infrastructure 30, the commercial sites 32 and the residential sites 34. The physical location information may be used, for example, by the OMS 36 and the DMS 38 in predicting and resolving outage issues. Additionally, the GIS 40 may be used to visualize the various locations on a map or other suitable visual medium (e.g., globe, chart). Likewise, a customer information system (CIS) 42 may be used to provide customer information (e.g., sites 32 and 34), including billing information, electric usage information, water usage information, gas usage information, billing rates, and the like. Additionally, an interactive voice response (IVR) system 44 may provide automated voice recognition and menu navigation suitable for processing customer requests over telephonic lines. As discussed below, each of the control applications (e.g., DMS) may be used via a computing system 48.

In certain embodiments, various information about the grid system 10 may be stored, accessed, and/or managed using the OMS 36, the DMS 38, the GIS 40, the CIS 42, and/or the IVR 44. However, development and deployment of a system grid 10 that utilizes multiple monitoring systems (e.g., DMS 38 and GIS 40) to independently track information common between the systems may be costly and difficult to implement. As discussed below, one or more management systems (e.g., GIS 40) may be used to track/store information as a master application and transmit components of the stored information that may be relevant to other management systems as slave applications (e.g., DMS 38). Although the following discussion refers to the GIS as the master application and the DMS as the slave application, any management system may be used to "master" infrastructure information shared with one or more other management systems.

Figure 2:
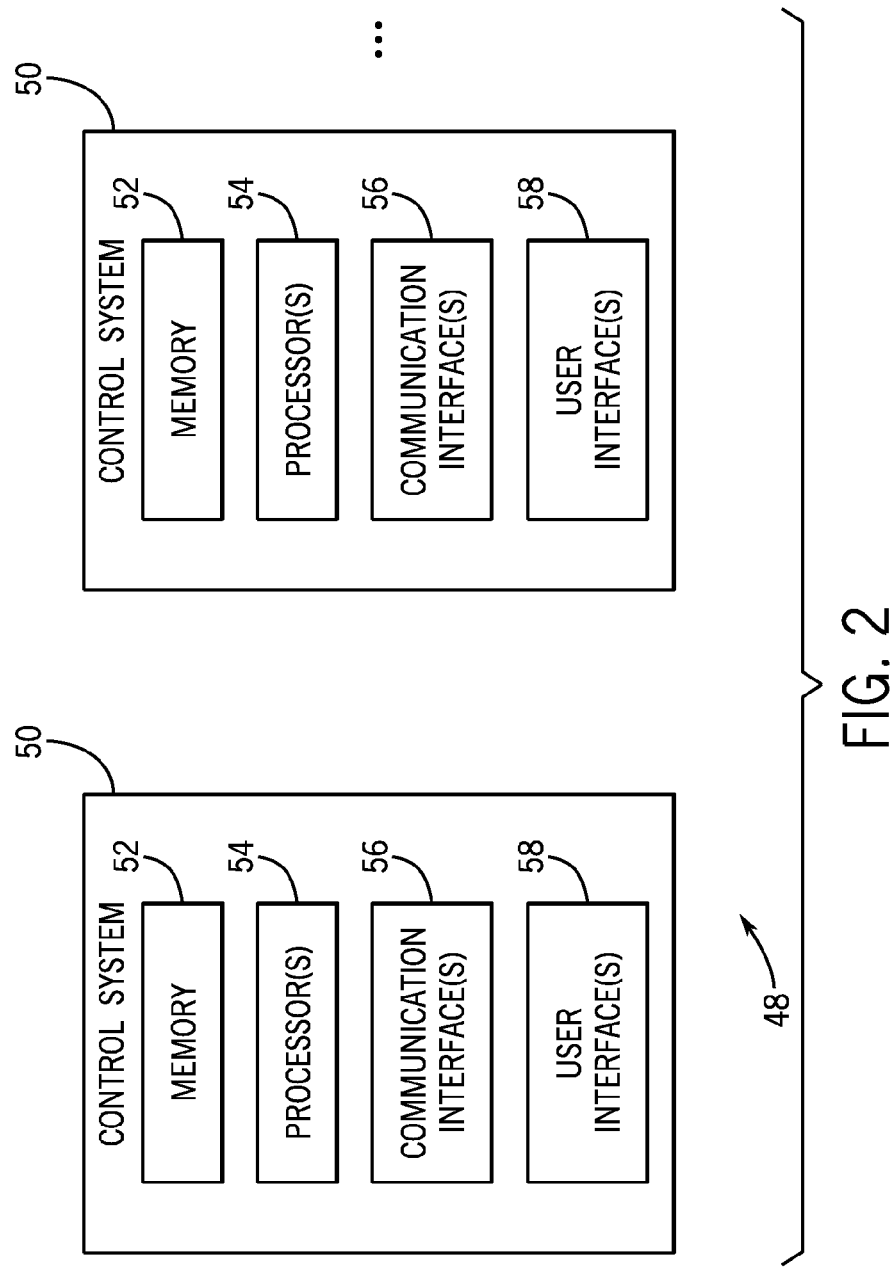
FIG. 2 illustrates a schematic view of an embodiment of a computing system that may be used in the utility network infrastructure of FIG. 1.

FIG. 2 illustrates a schematic view of a computing system 48 that may be used to store and/or run the OMS 36, the DMS 38, the GIS 40, the CIS 42, and/or the IVR 44. In certain embodiments, the computing system 48 may be at least partially located at the utility 12, an operating center, a distribution center, a transmission center, a generation center (e.g., power station), and/or other suitable locations. In some embodiments, the OMS 36, the DMS 38, the GIS 40, the CIS 42, and/or the IVR 44 may be included into one or more composite application packages, such as the PowerOn™ Fusion Advanced Distribution Management System made available by General Electric Company of Schenectady, N.Y. In other embodiments, the OMS 36, the DMS 38, the GIS 40, the CIS 42 may each be included in independent stand-alone applications or some combination of composite application and stand-alone applications.

In certain embodiments, the computing system 48 includes one or more control systems 50. Each control system 50 includes memory 52, processor(s) 54, communication interface(s) 56, and user interface(s) 58. The memory 52 may include one or more storage units that may store computer instructions non-transitory, computer-readable medium. In some embodiments, one or more storage units may be remote from other storage units that may be accessed by the processor(s) 54 via communication interface(s) 56. The processor(s) 54 include one or more suitable processing units, such as a central processing unit (CPU), a microprocessor, an application-specific instruction-set processor (ASIP), a physics processing unit (PPU), digital signal processor, network processor, a RISC-based processor, or other suitable processor. The communication interface(s) 56 includes a network interface controller (NIC) card or other hardware/software that enables each control system 50 to communicate with other control systems 50 in the computing system 48 via Ethernet, WiFi, Token Ring, and/or other suitable Local Area Network (LAN), Wide Area Network (WAN), and/or Personal Area Network (PAN) protocols. As discussed below, in some embodiments, the communication interface(s) 56 may include two or more communication interfaces 56 that communicate between control devices 50 within the computing system 48. The user interface(s) 58 include various input/output components that enable a user to interact with the computing system 48. For example, the user interface(s) 58 may include mice, keyboards, monitors, visual displays, graphical user interfaces (GUIs) shown on displays, trackpacks, number pads, and/or other suitable methods of enabling interaction between the computing device 50 and the user. In some embodiments, the user interface 58 may include a mobile device on which a field engineer may send proposed updates regarding physical portions of the grid system 10 when the field engineer notices a variation in the grid system 10 from stored infrastructure information regarding the grid system 10.

In some embodiments, the computing system 48 may include additional other components. In certain embodiments, the computing system 48 may include one or more computing devices as the control systems 50, such as a laptop computer, desktop computer, mainframe, workstation, tablet computer, and/or smartphone. For example, in some embodiments, one control system 50 may be used to execute the OMS 36 and the DMS 38 while a separate computing device may be used to execute the GIS 40. In such embodiments, the computing devices may communicate via respective communication interface(s) of the computing devices.

Figure 3:
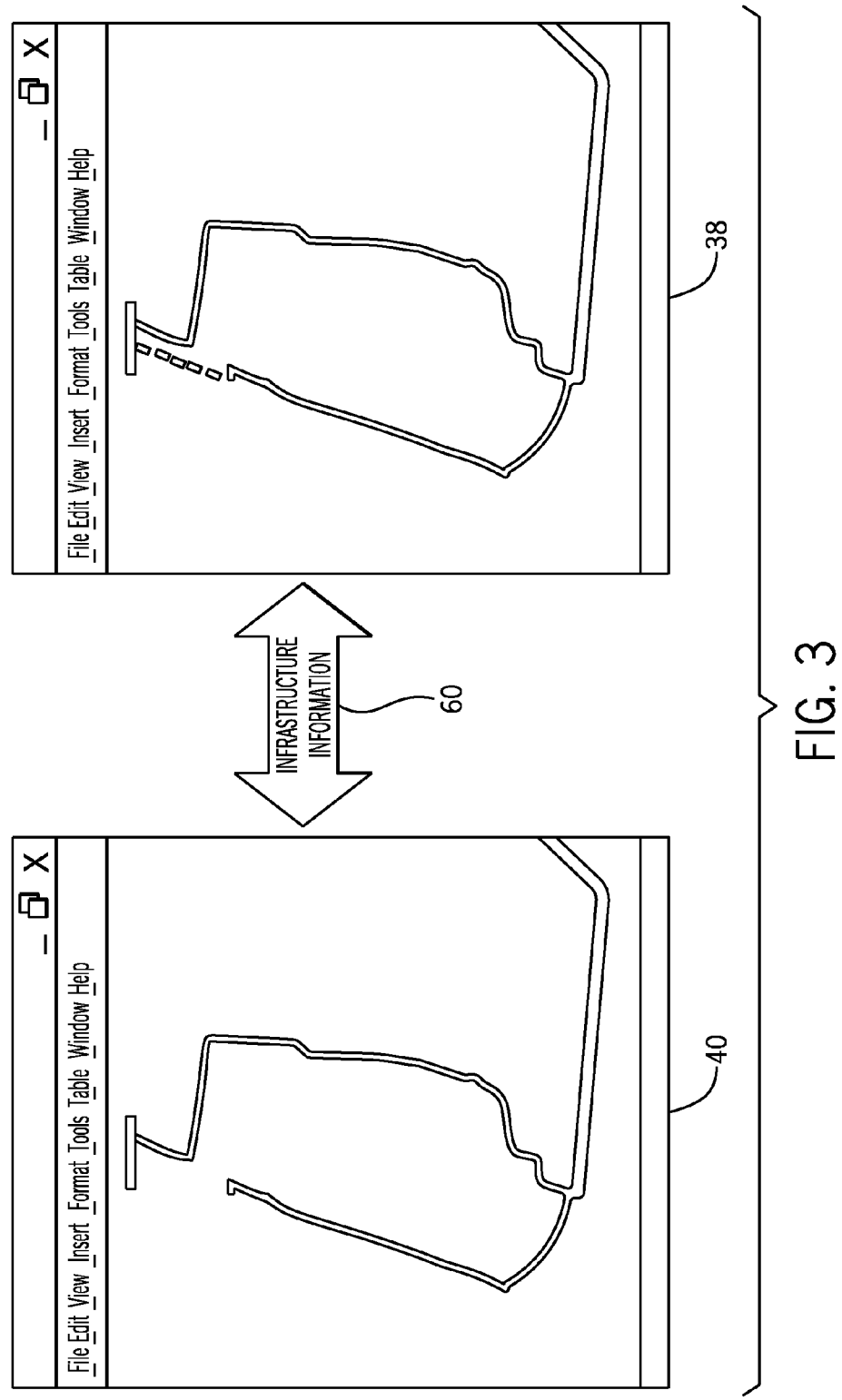
FIG. 3 illustrates a graphical view of a distribution management system and a graphical information system that may included in the computing system of FIG. 2.

FIG. 3 illustrates a graphical view of the DMS 38 and the GIS 40 sharing infrastructure information 60. The GIS 40 may also be used to provide for physical location information of the plants 16, 18, 20, and 22, grid 24 components (e.g., electrical cabling, transformers, distribution towers), grid 26 components (e.g., water pipes, valves, pressure reducers), grid 28 components (e.g., storage tanks, gas pipes, valves), the metering infrastructure 30, the commercial sites 32 and the residential sites 34. The GIS 40 may be used to design and model complex network infrastructures, such as those that may be present in the grid system 10. Additionally, in some embodiments, the GIS 40 may be used to update assets due to rephrasing (e.g., load balancing) and/or repositioning conductors.

The GIS 40 stores (e.g., in memory 54) various infrastructure information. Some of the stored infrastructure information may be relevant to the DMS 38. For example, the GIS 40 may include "as-built" information about the components of the grid system 10 that may be used by the DMS 38 to operate the grid network 10. Accordingly, in some embodiments, rather than tracking the information directly, the DMS 38 may receive common infrastructure information 60 that may be used by the DMS 38. In some embodiments, the infrastructure information 60 may include all information stored in the GIS 40. However, other embodiments of the DMS 38 may receive only certain information types that are relevant to both the DMS 38 and the GIS 40.

As previously discussed, the DMS 38 may be used to operate the grid system 10 or route services within the grid system 10. For example, the DMS 38 may be used to route power, water, and/or gas from plants 16, 18, 20, and 22. In certain embodiments, the DMS 38 may be used to provide network management capabilities used to plan and execute switching work, as well as operate the distribution network at various voltage levels, such as extra high voltage (EHV) sub transmission, high voltage (HV), and low-voltage (LV) distribution. For example, switching work may include applying cuts and jumpers to the grid system 10 for maintenance or other suitable situations. Moreover, in some embodiments, the DMS 38 may be used to reconfigure the grid system 10 or control voltage within the grid system 10. In certain embodiments, the DMS 38 may support providing versatile "off-the-shelf" compatibility with industrial control systems, such as supervisory control and data acquisition (SCADA) equipment.

In some embodiments, the master application (e.g., GIS 40) that stores the common infrastructure information may store more information about the grid system 10 than is used by the slave application (e.g., DMS 38). Accordingly, in some embodiments only a portion of relevant information is transmitted to the slave application. In certain embodiments, the master application may be updated at certain intervals (e.g., weekly, nightly, etc.), but the slave application may be updated more frequently. In other words, the slave application may use some information that is newer (e.g., upon update from a field technician using the user interface 58 of a mobile control system 50) than the information that is used in master application. To enable the use of newer information, the slave application may patch its infrastructure information to include the newer information. For example, if the GIS 40 is the master application, the master application may include as-built information that may be updated nightly or weekly in great detail, but the DMS 38 that slaves from the GIS 40 is used to energize the system and may use more current and/or less detailed infrastructure information.

Figure 4:
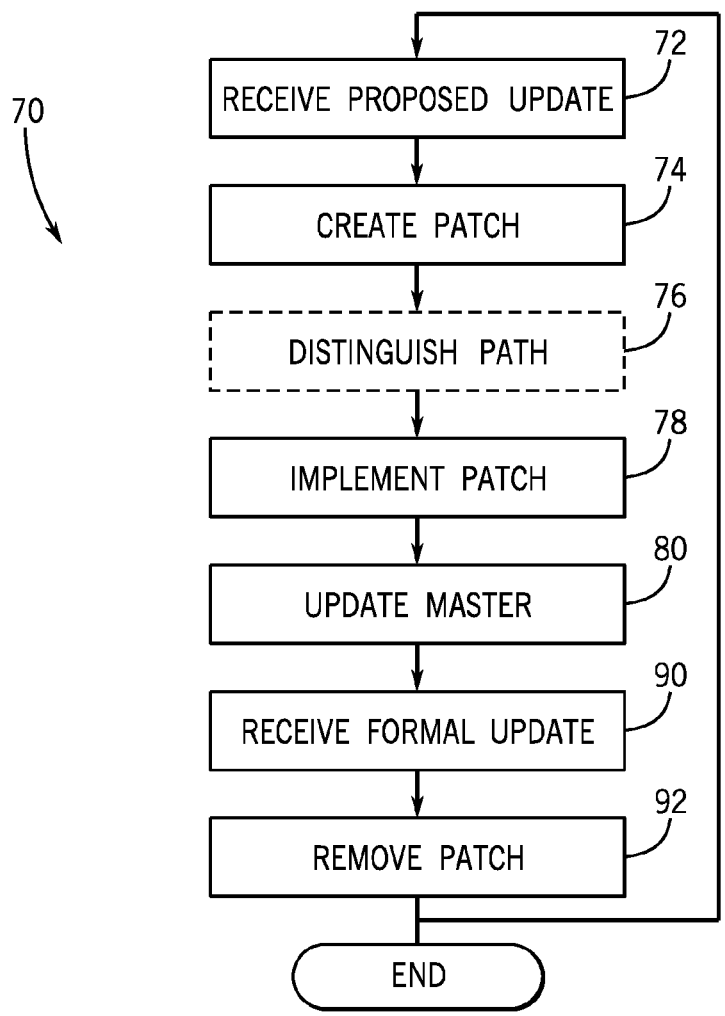
FIG. 4 illustrates a flow-diagram view of a method for synchronizing information relating to the utility network infrastructure of FIG. 1 from a slave application perspective.

FIG. 4 illustrates a flow-diagram view of an embodiment of a process 70 for synchronizing infrastructure information from a slave application (e.g., the DMS 38). The slave application receives a proposed update (block 72) via the user interface 58 and/or the communication interface 56. The proposed update indicates that the system grid 10 will change, has changed, or is otherwise different than the infrastructure information stored in the master application (e.g., GIS 40). The proposed update may include a permanent change or a temporary change. For example, a permanent change may include a physical re-routing of components of the grid system, and a temporary patch may include connectivity changes as part of a work package, such as a fault condition. In some embodiments, patches resulting from proposed permanent changes may be labeled as created, ready, or implemented. Additionally, in certain embodiments, proposed updates that include currently implemented changes in the system grid 10 may be indicated as a "redline" patch. As discussed below, a redline patch may be visually distinguished in the slave application.

After the slave application receives a proposed update, the slave application creates a patch that reflects the proposed update (block 74). In some embodiments, the slave application distinguishes the patch from infrastructure information that is currently synchronized with the master application. For example, information that is synchronized between the master and slave applications may be displayed in black, but patched information may be displayed as red. After the patch is created, the slave application implements the patch (block 78). The slave application may implement the patch by amending or supplementing infrastructure information stored in the memory 52. In some embodiments, once the patch has been implemented, the slave application updates the master application (block 80). In other embodiments, the patch may be sent to the master application after creation of the patch but before or during implementation of the patch in the slave application. In certain embodiments, the update to the master application may be provided directly to the master application from the slave application. In other embodiments, the master application may be updated by first sending the update to an intermediary, such as a cartographer or intermediate application that implements the patch in the master application. In such embodiments, the update to the master application may include cartographic images created by the intermediary (e.g., cartographer or cartographic application). In some embodiments, the update to the master application may occur over some period of time (e.g., hours, days, weeks, etc.)

Figure 5:
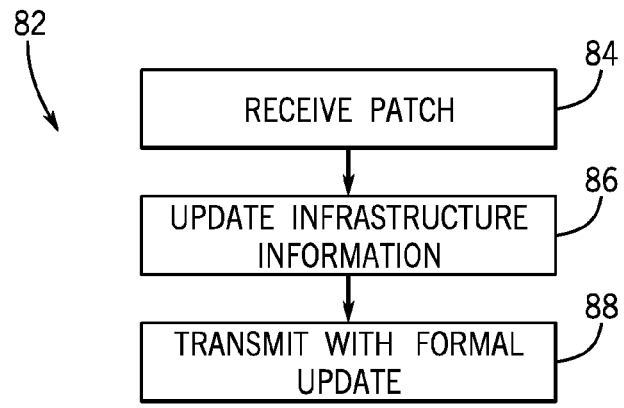
FIG. 5 illustrates a flow-diagram view of a method for synchronizing information relating to the utility network infrastructure of FIG. 1 from a master application perspective.

FIG. 5 illustrates a flow-diagram view of an embodiment of a process 82 for synchronizing infrastructural information into the master application. The master application receives a patch (block 84) from the slave application and/or an intermediary. Upon receipt of the patch, the master application may perform conflicts checks that determine whether the patch should be included in its infrastructure information stored in memory 52. If there are no conflicts or the conflicts are correctable, the patch is then saved in the master application's copy of infrastructure information stored in the memory 52 (block 86). After the master application copy of infrastructure information has been updated, the master application transmits a formal/finalized update to the slave application (block 88).

Returning to FIG. 4, once the master application sends a formal update, the slave application receives the formal update from the master application (block 90). After receiving the formal update, the slave application removes the patch from its copy of the infrastructure information (block 92). Instead, the slave application now incorporates infrastructure information that is synchronized with infrastructure information used by the master application. Moreover, if the patch is a redline patch, the visually distinguishing characteristics of the patch are also removed (e.g., red is changed to black).

Technical advantages of the disclosure include enabling a master application (e.g., GIS) to "master" information common between various applications (e.g., DMS) even if one or more of the slave applications use more updated information than the master application. By mastering the information in a master application that may store more information about the grid network than each slave application, computational/storage efficiency of a control application system having the master and slave applications may be increased. Due to the computational costs and complexity associated with updating a master application storing common information for the grid network, the master application may be updated less frequently than is desirable to update certain slave application. To update the master application economically without substantially negatively effecting time-sensitive information that may be present in some slave applications, such as the DMS, the slave applications may be patched with more updated information than that present in the master application until replaced by the updated information promulgated from the master application. In other words, by creating a patch for the slave applications, common information for the grid network control applications may be mastered economically and efficiently, without substantially interfering with time-sensitive information desired for use in the slave applications before the master application is updated.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A non-transitory, computer-readable medium storing instructions configured to cause a control system to:
   receive a proposed update to a grid system;
   upon receipt of the proposed update, create a patch based on the proposed update to amend infrastructure information relating to the grid system;
   implement the patch by storing the amended infrastructure information in memory; and
   send an updated patch related to the patch to a master application;
   receive a formal update from the master application that incorporates the amended infrastructure information as formally updated infrastructure information; and
   after receiving the formal update from the master application, replace the patch with the formal update.

2. The non-transitory, computer-readable medium of claim 1, wherein the instructions cause the computing system to receive the proposed update via a user interface device.

3. The non-transitory, computer-readable medium of claim 1, comprising instructions to cause the computing system to store data regarding the infrastructure information with a visual indicator used to indicate portions of the infrastructure information that has been amended by the implemented patch.

4. The non-transitory, computer-readable medium of claim 3, wherein visual indicator comprises redline for the portions of the infrastructure that have been amended.

5. The non-transitory, computer-readable medium of claim 3, comprising instructions to cause the computing system to remove visual indications from the portions of the infrastructure that have been amended upon receipt of the formal update from the master application.

6. The non-transitory, computer-readable medium of claim 1, wherein the master application comprises a graphical information system (GIS) configured to provide physical location information for components of the system grid.

7. The non-transitory, computer-readable medium of claim 1, comprising instructions to cause the computing system to execute a distribution management system (DMS) application configured to control distribution of a utility via the grid system for the grid system.

8. A device for synchronizing infrastructure information regarding a grid system, comprising:
   a processor configured to receive a proposed update to a grid system and upon receipt of the proposed update, create a patch from the proposed update to amend previously-stored infrastructure information relating to the grid system; and
   a memory configured to store the amended infrastructure information as the patch, wherein the processor is configured to send the patch to a master application, receive a finalized update from the master application, and after receiving the finalized update from the master application, replace the patch in memory with the finalized update.

9. The device of claim 8, wherein the processor is configured to execute a master application stored in memory, wherein the master application comprises a graphical information system (GIS) configured to provide physical location information for components of the grid system.

10. The device of claim 8, wherein the proposed update is received by the processor, and the processor is configured to execute a distribution management system (DMS) stored in the memory, wherein the DMS is configured to control distribution of a utility via the grid system.

11. The device of claim 8, wherein the proposed update corresponds to variation in the grid system from as-built infrastructure information stored in the memory.

12. The device of claim 8, wherein the processor is configured to send the patch to the master application by sending the patch first to an intermediary destination.

13. The device of claim 12, wherein the intermediary destination is a cartography application.

14. The device of claim 8, wherein the processor is configured to manage distribution of electricity in the grid system using the formal update or the patch.

15. A non-transitory, computer-readable medium storing instructions configured to cause a computing system to:
 receive a patch from a slave application configured to control at least a portion of the grid system, wherein the patch reflects amended infrastructure information regarding the grid system;
 formally update stored infrastructure information with the amended infrastructure information; and
 transmit the updated stored infrastructure information as a formal update to the slave application.

16. The non-transitory, computer-readable medium of claim 15, wherein a graphical information system (GIS) configured to provide physical location information for components of the grid system receives the patch, formally updates store infrastructure information, and transmits the updated stored infrastructure information.

17. The non-transitory, computer-readable medium of claim 15, wherein the slave application comprises a distribution management system (DMS) configured to control distribution of a utility via the grid system.

18. The non-transitory, computer-readable medium of claim 15, wherein the patch is received from the slave application via an intermediary.

19. The non-transitory, computer-readable medium of claim 15, wherein the patch comprises cartographic images.

\* \* \* \* \*